(12) United States Patent
Breitfuss et al.

(10) Patent No.: US 8,203,430 B2
(45) Date of Patent: Jun. 19, 2012

(54) DEVICE, SYSTEM AND METHOD FOR COMPENSATING SIGNAL DELAYS IN AN RFID COMMUNICATION SYSTEM

(75) Inventors: Klemens Breitfuss, Voitsberg (AT); Peter Thueringer, Graz (AT)

(73) Assignee: NXP B.V., Eindhoven (NL)

( * ) Notice: Subject to any disclaimer, the term of this patent is extended or adjusted under 35 U.S.C. 154(b) by 603 days.

(21) Appl. No.: 12/445,052

(22) PCT Filed: Sep. 27, 2007

(86) PCT No.: PCT/IB2007/053930
§ 371 (c)(1),
(2), (4) Date: Apr. 9, 2009

(87) PCT Pub. No.: WO2008/044160
PCT Pub. Date: Apr. 17, 2008

(65) Prior Publication Data
US 2010/0007467 A1 Jan. 14, 2010

(30) Foreign Application Priority Data
Oct. 12, 2006 (EP) .................................... 06021393

(51) Int. Cl.
*H04Q 5/22* (2006.01)
*G08C 19/16* (2006.01)
*G08B 1/00* (2006.01)
*G08B 23/00* (2006.01)
*H04B 1/44* (2006.01)

(52) U.S. Cl. ................. 340/10.1; 340/12.1; 340/309.16; 340/527; 370/282; 455/78

(58) Field of Classification Search .................. 340/10.1, 340/12.14, 309.16, 527, 4.35; 235/492, 240, 235/241, 354, 371; 370/282; 455/78
See application file for complete search history.

(56) References Cited

U.S. PATENT DOCUMENTS
4,857,919 A 8/1989 Braswell
(Continued)

FOREIGN PATENT DOCUMENTS
EP 1284469 A1 2/2003
(Continued)

OTHER PUBLICATIONS

Abrial, Andre, et al; "A New Contactless Smart Card IC Using an On-Chip Antenna and an Asynchronous Microcontroller"; IEEE Journal of Solid State Circuits; vol. 36, No. 7; Jul. 2001; pp. 1101-1107.

*Primary Examiner* — Daniel Wu
*Assistant Examiner* — Emily C Terrell

(57) ABSTRACT

An RFID communication system comprises an NFC device (11) and a smart card (2) with contactless card functionality, wherein the NFC device (11) and the smart card (2) are couplable to each other via a protocol converter (7), wherein the NFC device (11) is coupled to an antenna (3) to receive electromagnetic signals (ES) from an RFID reader/writer and to transmit response signals (RS) to the RFID reader/writer by modulating received electromagnetic signals (ES). The electromagnetic signals (ES) contain first and second characteristic components (FE, RE) which define the begin and the end of a predefined signal pattern (PA), wherein the second characteristic component triggers a predefined response delay time (FDT) at the expiration of which the RFID communication system has to respond to the RFID reader/writer. A device (12) for compensating signal delays is provided that comprises signal pattern shortening means (13).

18 Claims, 3 Drawing Sheets

U.S. PATENT DOCUMENTS

| | | | |
|---|---|---|---|
| 5,173,864 A | 12/1992 | Watanabe | |
| 5,581,708 A * | 12/1996 | Iijima | 710/11 |
| 6,010,074 A * | 1/2000 | Kelly et al. | 235/492 |
| 6,016,255 A * | 1/2000 | Bolan et al. | 361/807 |
| 6,036,100 A * | 3/2000 | Asami | 235/492 |
| 6,577,229 B1 * | 6/2003 | Bonneau et al. | 340/10.41 |
| 6,631,848 B1 * | 10/2003 | Gaultier | 235/492 |
| 7,986,916 B2 * | 7/2011 | Williams | 455/41.1 |
| 2001/0050922 A1 * | 12/2001 | Tiernay et al. | 370/467 |
| 2003/0020525 A1 * | 1/2003 | Shigemasa et al. | 327/143 |
| 2004/0076251 A1 * | 4/2004 | Kim | 375/354 |
| 2006/0022042 A1 * | 2/2006 | Smets et al. | 235/451 |
| 2006/0052055 A1 * | 3/2006 | Rowse et al. | 455/41.1 |
| 2006/0261927 A1 * | 11/2006 | Kelly et al. | 340/10.1 |
| 2006/0267736 A1 * | 11/2006 | Tiernay et al. | 340/10.51 |
| 2009/0137276 A1 * | 5/2009 | Baldischweiler et al. | 455/558 |

FOREIGN PATENT DOCUMENTS

| | | |
|---|---|---|
| EP | 1752915 A2 | 2/2007 |
| WO | 0169881 A2 | 9/2001 |

* cited by examiner

DEVICE, SYSTEM AND METHOD FOR COMPENSATING SIGNAL DELAYS IN AN RFID COMMUNICATION SYSTEM

FIELD OF THE INVENTION

The invention relates to a device for compensating signal delays in an RFID communication system, which RFID communication system comprises an NFC device and a smart card with contactless card functionality, wherein the NFC device and the smart card are couplable to each other via a protocol converter, wherein the NFC device is coupled to an antenna to receive electromagnetic signals from an RFID reader/writer and to transmit response signals to the RFID reader/writer by modulating received electromagnetic signals.

The invention further relates to a system for compensating signal delays in an RFID communication system, which RFID communication system comprises an NFC device and a smart card with contactless card functionality, wherein the NFC device and the smart card are couplable to each other via a protocol converter, wherein the NFC device is coupled to an antenna to receive electromagnetic signals from an RFID reader/writer and to transmit response signals to the RFID reader/writer by modulating received electromagnetic signals.

The system further comprises a method for compensating signal delays in an RFID communication system, which RFID communication system comprises an NFC device and a smart card with contactless card functionality, wherein the NFC device and the smart card are couplable to each other via a protocol converter, wherein the NFC device is coupled to an antenna to receive electromagnetic signals from an RFID reader/writer and to transmit response signals to the RFID reader/writer by modulating received electromagnetic signals.

BACKGROUND OF THE INVENTION

Nowadays, many smart cards according to the standard ISO/IEC 14443A are used. These smart cards are also used in conjunction with SIM modules. In standard applications the smart cards are directly connected with an antenna via analog signal lines. However, for other applications of smart cards, particularly when they are employed in SIM modules, it would also be desirous to directly connect existing types of smart cards with near field communication (NFC) devices without the need to provide separate antennas for both the smart card and the NFC device. In order to connect smart cards and NFC devices with each other; it is necessary to connect said devices via a protocol converter rather than connecting them directly, since the signal protocols and interfaces of smart cards and NFC devices are not compatible with each other. Specifically, the digital interfaces (S2C interface) of NFC devices cannot be connected to the antenna lines of smart cards, since these lines are analog signal lines. The problems associated with the present inefficient solutions for matching NFC devices and smart cards will be explained now in greater detail with reference to the block diagram of FIG. 1.

FIG. 1 shows a block circuit diagram of a configuration of an NFC device 1 indirectly connected to a smart card 2 which both per se are compliant with the international standard ISO 14443A. In order to enable communication between the NFC device 1 and the smart card 2, a protocol converter 7 is switched between the NFC device 1 and the smart card 2. It should be noted that in this configuration only the NFC device 1 is connected to an antenna 3 at its input. The protocol converter 7 converts the signals flow between a digital interface of the NFC device 1 comprising the digital output line SIGOUT and the digital input line SIGIN and an analog interface of the smart card 2 comprising the bidirectional analog lines La and Lb. All mentioned devices are connected to ground potential GND. The NFC device 1 receives electromagnetic signals ES from the antenna 3 and comprises a demodulator 4 being adapted to demodulate the electromagnetic signals ES and to convert them into square-wave signals DES (see FIG. 5) that are transmitted via line SIGOUT. The NFC device 1 further comprises a load modulator 5 being adapted to modulate the electromagnetic signals ES transmitted from a card reader/writer (not shown). The protocol converter 7 converts the digital square-wave signals DES received via line SIGOUT into analog signals and transmits said analog signals via lines La, Lb to the smart card 2. The smart card 2 processes the received analog signals by extracting information and instructions from them and, if necessary, sends an analog response signal R1 via lines La, Lb which is converted by the protocol converter 7 into a digital response R2 that controls the load modulator 5 of the NFC device 1. The drawback of this known system, however, is that the timing of the resulting response RS from the NFC device 1 to the RFID reader/writer does not any longer comply with ISO 14443, but due to the signal delays mainly caused by the signal conversion within the protocol converter 7, are outside of the specifications of ISO 14443, as will now be explained with reference to the timing diagram of FIG. 5.

The uppermost line in the timing diagram of FIG. 5 depicts the electromagnetic signal ES that is transmitted by the RFID reader/writer as is received at the antenna 3. The electromagnetic signal ES comprises a carrier signal CS that has been ASK modulated with a serial data signal DS. The data signal DS is compliant with the Modified Miller Code which defines the value '0' or '1' of a bit by the position of a predefined signal pattern PA, i.e. a short pause in the signal flow. If the pause occurs at the half-bit period the value of the bit is '1'. If there is no pause within the bit length or the pause is considerably offset from the half-bit period, the value of the bit is '0'. The timings of the pauses are precisely defined in ISO 14443 and are shown in the timing diagram of FIG. 3.

It is apparent from FIG. 3 that the electromagnetic signal ES that has been ASK modulated with the data signal DS comprises a predefined signal pattern PA that is represented by a signal pause. The pause within the data signal DS is initiated by a falling signal edge as a first characteristic component FE and ends with a rising signal edge as a second characteristic component RE. When the length of the initiating falling edge is taken into account a length t1 of the pause may vary between 2 μs and 3 μs. When the length t3 of the rising edge is also taken into account the length (t1+t3) of the pause may be up to 4.5 μs. The absolute minimum value t2 of the pause, which is reached when no edges are taken into account, is 0.5 μs. It should be noted that due to physical conditions an RFID reader/writer operating in an RF field tends to produce signals having relatively long edges. It should further be observed that the specifications of ISO 14443 allow for some tolerances in the design of RFID communication systems.

In FIG. 5, second line it is shown that the demodulator 4 within the NFC device 1 has converted the analog electromagnetic signal ES into a digital square-wave signal DES having a frequency that is equal to the frequency of the carrier signal CS, i.e. 13.56 MHz for RFID communication systems according to IS 14443. Due to the digital nature of the square-wave signal DES, the lengths of the rising and falling edges are negligible in respect to the overall length t1 of the pause.

It should also be noted that according to ISO 14443 data between the RFID reader/writer on the one hand and the NFC device on the other hand are exchanged by way of frames, i.e. series of data bits and optional error detection bits, with frame delimiters at start and end. Further, there is a so called frame delay time FDT which is defined as the time between two frames transmitted in opposite directions. The frame delay time FDT must not remain under a defined minimum frame delay time and must not exceed a defined maximum frame delay time either. For communication in direction from the RFID reader/writer, the frame delay time FDT is defined as the time between the end (rising edge RE) of the last pause PA transmitted by the RFID reader/writer and the first modulation edge ME within the startbit of the response signal RS transmitted by the NFC device 1. The frame delay time FDT is defined as an integer multiple of the carrier signal frequency and typically amounts to 91 µs. The above described timings can be best seen in the timing diagram of FIG. 4. However, as has already been explained above, with the known RFID communication system of FIG. 1 this timing specification cannot be fulfilled due to internal signal delays t5 that are mainly caused by the protocol converter 7. For a better illustration of these timing problems it is once more referred to the timing diagram of FIG. 5. The third line of this diagram shows a correct response signal RS of a standard-conform stand-alone NFC device which response signal RS is delayed by the frame delay time FDT that is triggered by the end (rising edge RE) of the last pause PA transmitted by the RFID reader/writer. On the other hand, the fourth line of this diagram shows a response signal RS produced by the RFID communication system according to FIG. 1. It is apparent that the response signal RS is not only delayed by the frame delay time FDT, but is also delayed by the internal delay time t5. The sum of the frame delay time FDT and the internal delay time t5 exceeds the admissible response delay time so that the known RFID communication system operates outside of the specifications of ISO 14443.

OBJECT AND SUMMARY OF THE INVENTION

It is an object of the invention to provide a device of the type defined in the opening paragraph, an RFID communication system of the type defined in the second paragraph and a method of the type defined in the third paragraph, in which the disadvantages illustrated above are avoided.

A device according to the invention can be characterized in the way defined below, that is:

A device for compensating signal delays in an RFID communication system, which RFID communication system comprises an NFC device and a smart card with contactless card functionality, wherein the NFC device and the smart card are couplable to each other via a protocol converter, wherein the NFC device is coupled to an antenna to receive electromagnetic signals from an RFID reader/writer and to transmit response signals to the RFID reader/writer by modulating received electromagnetic signals, wherein the electromagnetic signals contain first and second characteristic components which define the begin and the end of a predefined signal pattern, wherein the second characteristic component triggers a predefined response delay time at the expiration of which the RFID communication system has to respond to the RFID reader/writer, wherein the device for compensating signal delays comprises signal pattern shortening means.

In order to achieve the object defined above, an RFID communication system according to the invention comprises a device for compensating signal delays in an RFID communication system according to the above paragraph.

In order to achieve the object defined above, with a method according to the invention characteristic features are provided so that a method according to the invention can be characterized in the way defined below, that is:

A method for compensating signal delays in an RFID communication system, which RFID communication system comprises an NFC device and a smart card with contactless card functionality, wherein the NFC device and the smart card are couplable to each other via a protocol converter, wherein the NFC device is coupled to an antenna to receive electromagnetic signals from an RFID reader/writer and to transmit response signals to the RFID reader/writer by modulating received electromagnetic signals, wherein the electromagnetic signals contain first and second characteristic components which define the begin and the end of a predefined signal pattern, wherein the second characteristic component triggers a response delay time at the expiration of which the RFID communication system has to respond to the RFID reader/writer, wherein the method comprises the step of shortening the signal pattern within the RFID communication system.

The characteristic features according to the invention provide the advantage that internal signal delays in the RFID communication system can fully be compensated. Particularly, signal delays caused by a protocol converter are compensable. Hence, the present invention provides the advantage that standard NFC devices and standard smart cards can be combined with each other via a protocol converter and the resulting RFID communication system is nevertheless fully compliant with ISO 14443. It should be observed that the term "smart card" as used herein also comprises so called "Secure Elements" like SIM or SAM cards.

In a preferred embodiment of the invention that is easy to implement, the signal pattern shortening means comprise detecting means being adapted to detect the first characteristic component of the signal pattern and a signal generator, preferably being configured as a square-wave signal generator, wherein the detecting means are configured to stop the signal generator when they detect the first characteristic component and to restart the signal generator after a predefined time period after the occurrence of the first characteristic component.

In order to make use of presently available protocol converters it is further preferred to operate the signal generator at a frequency that is equal to the frequency of a carrier signal in the electromagnetic signals.

It is a further object of the invention to provide a device and a method for compensating signal delays in an RFID communication system that are fully compliant to ISO 14443. To achieve this object, the detecting means are configured to detect a pause signal as the predefined signal pattern, and particularly to detect an edge of the pause signal as the first characteristic component of the signal pattern.

In principle, when the internal signal delays within the RFID communication system are known, the signal pattern shortening means could be set to a fixed value by which the signal pattern is shortened. However, in order to achieve higher flexibility and automatic adaptation to changing signal conditions, it is preferred to provide response delaying means being adapted to delay a response from the smart card. For highest flexibility the response delaying means are configured to adjustably delay the response from the smart card.

An automatic adaptation to varying lengths of the signal pattern that triggers the response delay time can be achieved by configuring the response delaying means such that a response is delayed until the predefined response delay time—counted from the occurrence of the second characteristic component of the signal pattern within the received electromagnetic signal—has expired.

It should be noted that the features of the inventive method can be directly implemented in the device and the RFID communication system, respectively.

The aspects defined above and further aspects of the invention are apparent from the exemplary embodiment to be described hereinafter and are explained with reference to this exemplary embodiment.

BRIEF DESCRIPTION OF THE DRAWINGS

The invention will be described in more detail hereinafter with reference to an exemplary embodiment. However, the invention is not limited to this exemplary embodiment.

DESCRIPTION OF EMBODIMENTS

Figure 2:
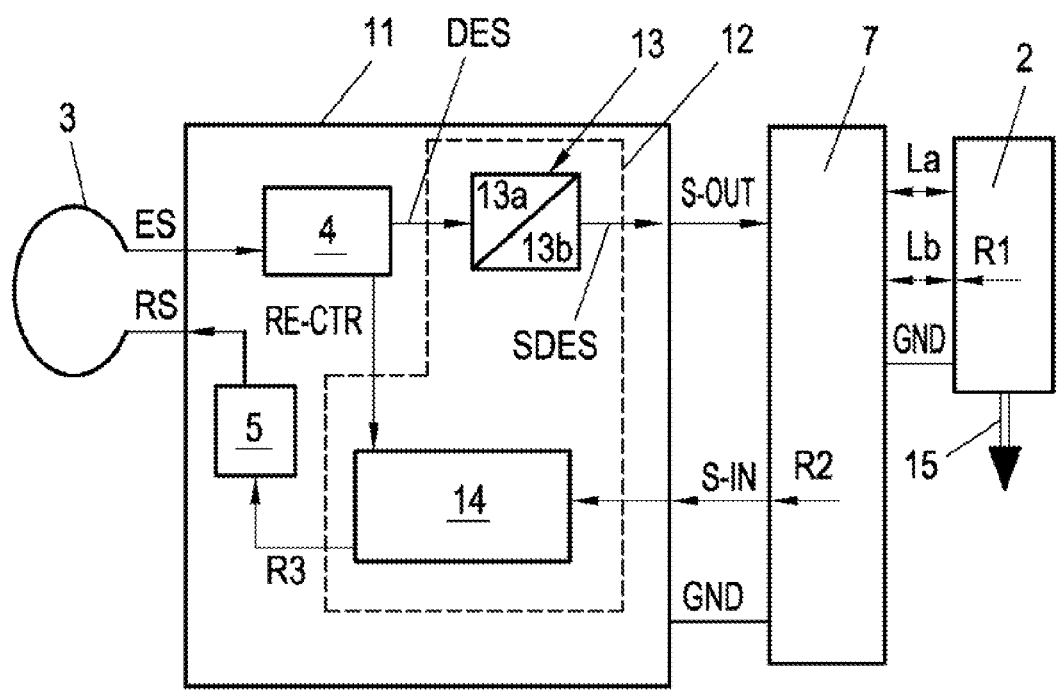
FIG. 2 shows a block diagram of an RFID communication system according to the present invention.

Now referring to FIG. 2, an embodiment of an RFID communication system according to the present invention is explained in detail. This RFID communication system is configured in compliance with ISO 14443. It comprises an NFC device 11 and a smart card 2. The smart card 2 comprises a standard 7816 Interface 15 and has additionally contactless card functionality which means that the smart card 2 comprises bidirectional analog lines La and Lb, which are couplable to an antenna 3 to receive electromagnetic signals from an RFID reader/writer. For the sake of clearness, the RFID reader/writer is not shown in the figure because it is well known in the art and is not part of the invention. However, in the present invention the lines La, Lb are coupled to a protocol converter 7 which may be of a conventional design. The protocol converter 7 is further coupled to a digital output line S-OUT and a digital input line S-IN of the NFC device 11. The protocol converter 7 converts digital signals received from the NFC device 11 via line S-OUT into analog signals being transmittable via lines La, Lb to the smart card 2. The protocol converter 7 also converts analog signals received from the smart card 2 via lines La, Lb into a digital signal that is transmitted to the NFC device 11 via line S-IN.

Figure 1:
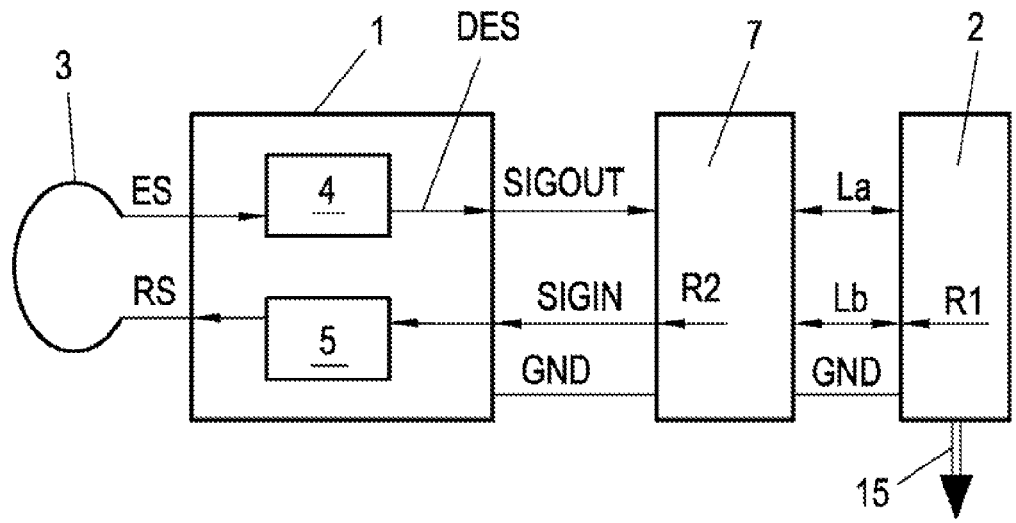
FIG. 1 shows a block diagram of an RFID communication system according to prior art.
Figure 3:
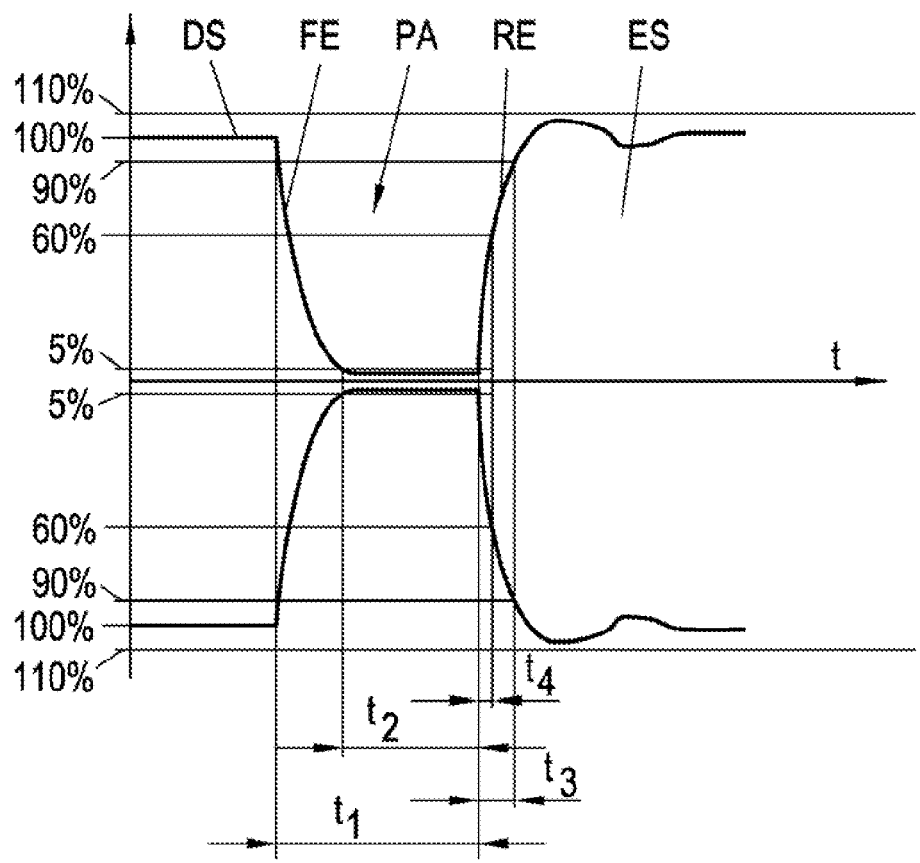
FIG. 3 is a timing diagram of a signal pattern shaped as a pause within an electromagnetic signal, according to ISO 14443.
Figure 4:
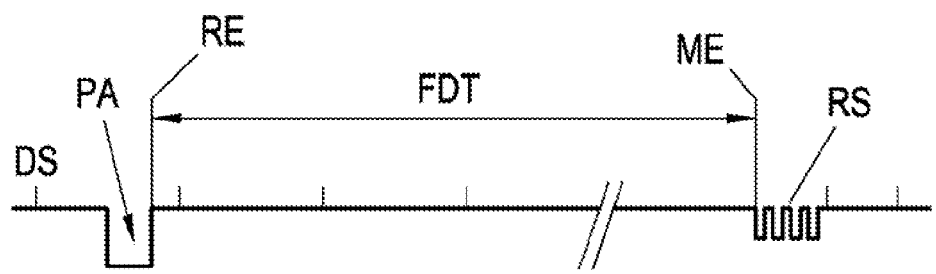
FIG. 4 is a timing diagram explaining the definition of a frame delay time in the context of ISO 14443.

According to the invention, a device 12 for compensating signal delays in the RFID communication system is provided. In the present embodiment this signal delay compensating device 12 is integrated in the NFC device 11, but it should be observed that the signal delay compensating device 12 can also be configured as an independent device. In the latter case, a standard NFC device 1 like that of the prior art RFID communication system according to FIG. 1 could be used instead of the NFC device 11. The signal delay compensating device 12 comprises signal pattern shortening means 13 which are adapted to shorten a predefined signal pattern PA (see FIGS. 3-5) being present in the signals DES that are input to the signal delay compensating device 12 and to output the thus "accelerated" signal SDES via line S-OUT to the protocol converter 7. The idea behind this measure is that by accelerating or advancing signals within the RFID communication system the protocol converter 7 gains some extra time for converting the output signal of the signal delay compensating device 12 and for reconverting a response of the smart card 2, thereby having enough margin to accomplish its converter tasks without violating timing requirements. It should be noted that timing requirements of any standard are important for external communication with external devices like the RFID reader/writer, but within the RFID communication system it is possible to deviate from said timing requirements.

The signal pattern shortening means 13 comprise detecting means 13a that are adapted to detect a first (leading) characteristic component FE of the signal pattern PA and a digital signal generator 13b that is preferably configured as a square-wave signal generator. The detecting means 13a are configured to stop the signal generator 13b when they detect the first characteristic component FE and to restart the signal generator after a predefined time period t6 after the occurrence of the first characteristic component FE.

It has been mentioned that the present embodiment of the invention is configured according to ISO 14443. That means that the predefined signal pattern PA is represented by a pause of a defined length, that the first characteristic component FE of the signal pattern PA is represented by a falling edge, and that the second characteristic component RE of the signal pattern PA is represented by a rising edge, see FIG. 3. Further, the predefined response delay time FDT at the expiration of which the RFID communication system has to respond to the RFID reader/writer is the frame delay time FDT shown in FIG. 4.

The operation of the RFID communication system according to the invention will now be explained by reference to the timing diagram of FIG. 5.

Figure 5:
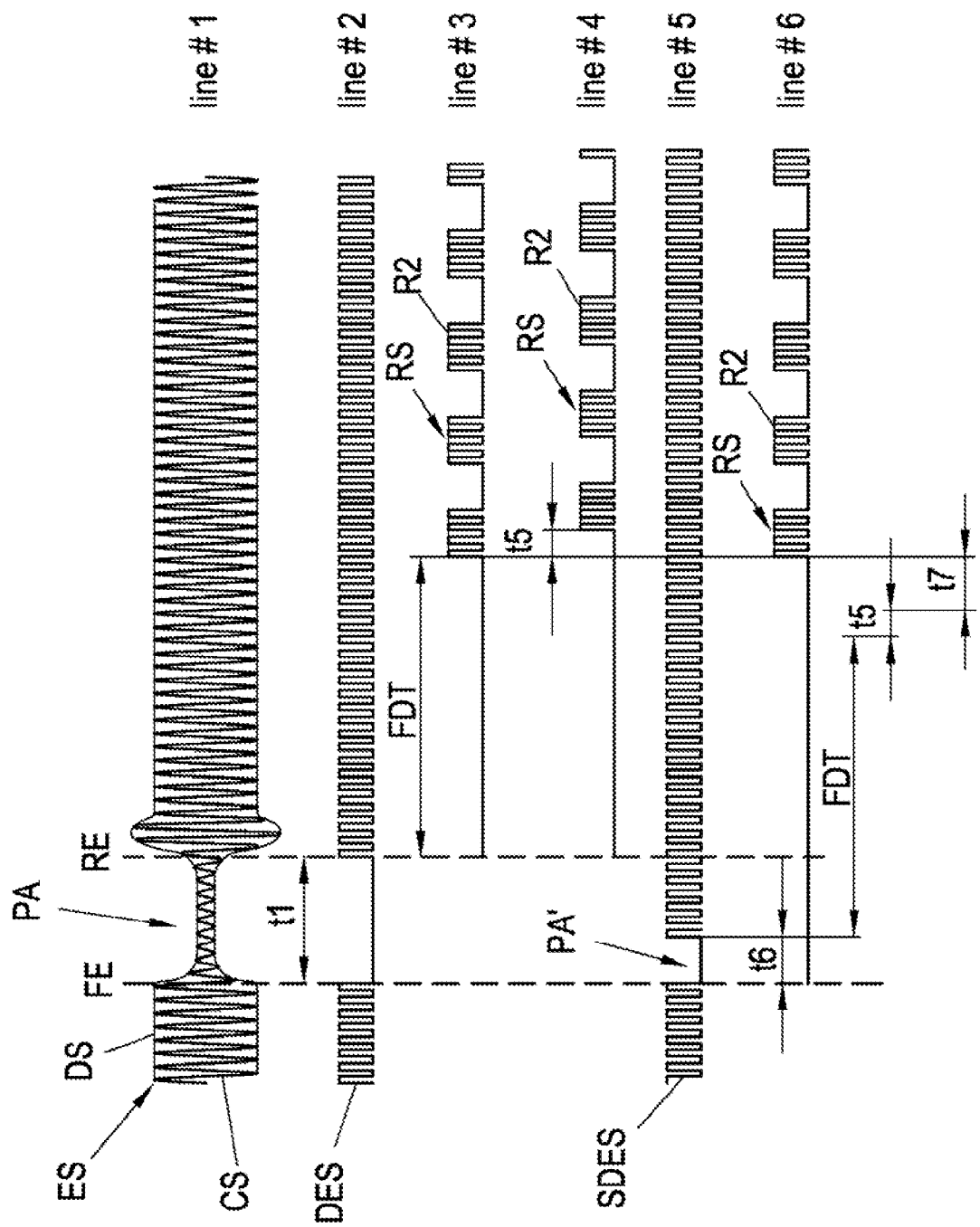
FIG. 5 is a timing diagram explaining and comparing various signals and their delays within RFID communication systems according to the invention and according to prior art.

Under the preconditions of ISO 14443, the electromagnetic signal ES from the RFID reader/writer as received by the antenna 3 comprises a carrier signal CS that is modulated by a data signal DS, see the uppermost line of the diagram of FIG. 5. In the demodulator 4 the electromagnetic signal ES is converted into a digital input signal DES that contains square-wave signals having the frequency of the carrier signal CS, i.e. 13.56 MHz wherein the pauses PA are maintained in their length t1. The digital input signal DES is fed to the pattern shortening means 13. Since the digital input signal DES still contains the first characteristic component FE, i.e. the falling signal edge initiating the pause PA, the detecting means 13a are able to detect it and—when having detected it—to stop the signal generator 13b and to trigger an internal timer (not shown) that is set to a predefined shortened signal pattern time t6. When the timer has elapsed, the detecting means 13a restart the signal generator 13b. Thereby the original pause PA is transformed into a shortened pause PA'. However, even the shortened pause PA' still contains the first and second characteristic components FE and RE of the predefined signal pattern, i.e. the pause PA. It should be noted that the frequency of the square-wave signals generated by the signal generator 13b is equal to the frequency of the carrier signal CS, i.e. 13.56 MHz. The resulting output signal SDES of the signal generator 13b is shown in the fifth line of FIG. 5. It is similar to the output signal DES of the demodulator 4 with the exception, that the pause PA' is considerably shorter than the original pause PA (time period t6 instead of time period t1).

The protocol converter 7 receives the output signal SDES of the signal generator 13b via line S-OUT and converts it into an analog signal that is similar to the electromagnetic signal of the first line of FIG. 5. When the smart card 2 detects the end of the pause, it waits until the frame delay time FDT has expired and then transmits analog response signals R1 to the protocol converter 7 which converts them into digital response signals R2. Due to various internal signal delays within the RFID communication system occurring during signal processing, the digital response signal R2 is delayed in respect of the analog response signal R1. Although mainly the protocol converter 7 contributes to this delay, there are some other circuits within the RFID communication system that are responsible for delays, too. Nevertheless, independently of the exact source of delay, an overall internal signal delay t5 can be defined that comprises all the various internal delay sources. However, due to the inventive idea to shorten the pause PA to the shortened pause PA' by means of the signal pattern shortening means 13 despite of the internal signal delay t5 the digital response signals R2 are still in advance in respect of the frame delay time FDT expected by the external RFID reader/writer. Thus, in order to meet the specifications of ISO 14443 (see FIG. 4 and explanations) this advancing of the response signal R2 has to be compensated. According to the invention, this object is achieved by providing the signal delay compensating device 12 with response delaying means 14 which are adapted to delay the response signals R1 generated by the smart card 2, or strictly speaking, to delay the digital response signal R2 by an additional delay time t7 that is required to keep the externally seen frame delay time FDT. To this end, the response delaying means 14 receive an input signal RE-CTR from the demodulator 4 that is sent when the demodulator 4 detects the second characteristic signal component RE of the predefined signal pattern PA, i.e. the rising edge of the pause. As soon as the response delaying means 14 have been triggered by the input signal RE-CTR, the response delaying means 14 start a timer (not shown) that is set to the frame delay time FDT, i.e. to approx. 91 µs. As long as said timer has not elapsed, the response delaying means 14 temporarily store the digital response signals R2, thereby adding an additional delay time t7 to these signals. As soon as the timer has elapsed, the response delaying means 14 pass the digital response signals (numeral R3 in FIG. 2) to the load modulator 5 which modulates the electromagnetic signals ES according to the digital response signals R3, thereby transmitting the resulting response signals RS to the RFID reader/writer. For the sake of simplicity of explanation it is assumed that the load modulator 5 does not add any further delays to the response signals RS or that such delays are contained in the internal signal delay t5, respectively. With this invention the RFID communication system according to the invention perfectly corresponds to ISO 14443 despite the fact that it contains devices like the protocol converter 7 that are not compliant with ISO 14443.

It should be observed that although the present invention has been illustrated by an embodiment which is an implementation according to ISO 14443, the present invention is not limited to this standard, but is applicable to any RFID communication system with comparable timing requirements.

Finally, it should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. In a device claim enumerating several means, several of these means may be embodied by one and the same item of software or hardware. The mere fact that certain measures are recited in mutually different dependent claims does not indicate that a combination of these measures cannot be used to advantage.

The invention claimed is:

1. A device for compensating signal delays in an RFID communication system, the device comprising:
   an NFC device coupled to an antenna to receive electromagnetic signals from an RFID reader/writer and to transmit response signals to the RFID reader/writer by modulating received electromagnetic signals, wherein the electromagnetic signals contain first and second characteristic components which define the begin and the end of a predefined signal pattern, wherein the NFC device is configured and arranged to transmit the response signals to the RFID reader/writer after a predefined response delay time, in response to the second characteristic component;
   a signal pattern shortening circuit configured and arranged to compensate for signal delays by shortening the signal pattern of the received signal; and
   a smart card with contactless card functionality, wherein the NFC device and the smart card are coupled to each other via a protocol converter, the signal pattern shortening circuit being configured and arranged to provide the received signal with the shortened signal pattern to the smart card via the protocol converter.

2. The device according to claim 1, wherein the signal pattern shortening circuit includes a signal generator configured and arranged to generate and output the received signal with the shortened signal pattern, and to stop outputting the signal in response to the first characteristic component of the signal pattern being detected, and wherein the signal generator is configured and arranged to start starts to output signals again after a predefined shortened signal pattern time.

3. The device according to claim 2, wherein the electromagnetic signals transmitted by the RFID reader/writer include a carrier signal that is modulated by a data signal wherein the signal generator is configured and arranged to generate and output the received signal with the shortened signal pattern by generating an outputting a signal having a frequency equal to the frequency of the carrier signal.

4. The device according to claim 1, wherein the first and second characteristic components of the signal pattern are falling or rising signal edges.

5. The device according to-claim 1, wherein the predefined signal pattern is a signal pause pattern.

6. The device according to claim 1, further comprising a response delay circuit configured and arranged to delay a response from the smart card by an additional delay time.

7. The device according to claim 6, wherein the response delay circuit is configured and arranged to adjust the additional delay time.

8. The device according to claim 7, wherein the response delay circuit is configured and arranged to adjust the additional delay time to delay the response signal to the RFID reader/writer until the response delay time counted from the occurrence of the second characteristic component has expired.

9. An RFID communication system, comprising:
   an NFC device coupled to an antenna to receive electromagnetic signals from an RFID reader/writer and to transmit response signals to the RFID reader/writer by modulating received electromagnetic signals, wherein the electromagnetic signals contain first and second characteristic components which define the begin and the end of a predefined signal pattern, wherein the NFC device is configured and arranged to transmit the response signals to the RFID reader/writer after a predefined response delay time, in response to the second characteristic component;

a device for compensating signal delays that includes a signal pattern shortening circuit configured and arranged to generate a signal having a shortened signal pattern, based on the received electromagnetic signals; and a smart card with contactless card functionality, wherein the NFC device and the smart card are coupled to each other via a protocol converter.

10. The RFID communication system according to claim 9, wherein the system complies with ISO 14443.

11. A method for compensating signal delays in an RFID communication system, the method comprising:

receiving electromagnetic signals from an RFID reader/writer by an NFC device coupled to an antenna;

compensating for signal delays by generating signals having a shortened signal pattern, from the received electromagnetic signals; and transmitting response signals to the RFID reader/writer by the NFC device by modulating the received electromagnetic signals, wherein the electromagnetic signals contain first and second characteristic components which define the begin and the end of a predefined signal pattern, and by triggering a predefined response delay time based upon the second characteristic component at the expiration of which the RFID communication system transmits the response signals to the RFID reader/writer.

12. The method according to claim 11, further comprising: detecting the first characteristic component; and wherein generating signals having a shortened signal pattern includes stopping a square-wave signal generator from generating signals when the first characteristic component is detected so that the signal pattern is shortened, and restarting the square-wave signal generator to output signals after a predetermined shortened signal pattern time after the detection of the first characteristic component.

13. The method according to claim 12, wherein the electromagnetic signals received from the RFID reader/writer include a carrier signal that is modulated by a data signal wherein the frequency of the signals generated by the signal generator are equal to the frequency of the carrier signal.

14. The method according to claim 11, wherein the first and second characteristic components of the signal pattern are falling or rising signal edges.

15. The method according to claim 11, wherein the predefined signal pattern is a signal pause pattern.

16. The method according to claim 11, further comprising providing the generated signals having a shortened signal pattern to a smart card via a protocol converter, providing a response from the smart card to the generated signals, to the NFC device, and delaying the response from the smart card by an additional delay time.

17. The method according to claim 16, wherein the additional delay time is adjusted in operation.

18. The method according to claim 17, wherein the additional delay time is adjusted such that a response signal is delayed until the response delay time counted from the occurrence of the second characteristic component has expired.

* * * * *